US009195864B2

(12) United States Patent
Simmons, Jr.

(10) Patent No.: US 9,195,864 B2
(45) Date of Patent: Nov. 24, 2015

(54) GEOGRAPHIC CHIP LOCATOR

(71) Applicant: Lawrence D. Simmons, Jr., Edina, MN (US)

(72) Inventor: Lawrence D. Simmons, Jr., Edina, MN (US)

( * ) Notice: Subject to any disclaimer, the term of this patent is extended or adjusted under 35 U.S.C. 154(b) by 50 days.

(21) Appl. No.: 13/769,512

(22) Filed: Feb. 18, 2013

(65) Prior Publication Data
US 2014/0231516 A1 Aug. 21, 2014

(51) Int. Cl.
G06K 7/08 (2006.01)
G06K 7/10 (2006.01)

(52) U.S. Cl.
CPC .................. G06K 7/10009 (2013.01)

(58) Field of Classification Search
USPC ............... 235/451; 340/572.1–572.9
See application file for complete search history.

(56) References Cited

U.S. PATENT DOCUMENTS

| 6,487,681 | B1 | 11/2002 | Tuttle |
| 8,346,210 | B2 | 1/2013 | Balsan et al. |
| 8,364,552 | B2 | 1/2013 | Ciurea |
| 8,368,515 | B2 | 2/2013 | Kim |
| 8,370,629 | B1 | 2/2013 | Ngo et al. |
| 8,373,429 | B2 | 2/2013 | Slupsky |
| 8,374,546 | B2 | 2/2013 | Maugars et al. |
| 2005/0256763 | A1 * | 11/2005 | Bohonnon ...................... 705/13 |
| 2007/0205865 | A1 * | 9/2007 | Rofougaran et al. ........ 340/10.1 |
| 2007/0236332 | A1 * | 10/2007 | Quan et al. ................... 340/10.1 |

* cited by examiner

*Primary Examiner* — Jamara Franklin
(74) *Attorney, Agent, or Firm* — Mark A. Litman & Associates, P.A.

(57) ABSTRACT

A system obtains and transmits and stores information, including location information of an article associated with a chip. The system may contain at least: an article intimately associated with an electromagnetically interrogatable chip; a hand-held information receiving and transmitting device that can interrogate the chip, the hand-held information receiving and transmitting device comprising an RFID and/or NFC reader to electromagnetically interrogate the chip; the chip containing communicable information relating to the article; a distal server in wireless two-way communication with the hand-held information receiving and transmitting device, the distal server capable of receiving, storing and transmitting information from the chip transmitted through the hand-held device. Upon interrogation of the chip by the hand-held device, the hand-held device communicates data received in response from the interrogation of the chip to the server, the server containing information in memory that is transmitted to and receive by the hand-held device. The information contained in memory may include information specific to the article.

14 Claims, 3 Drawing Sheets

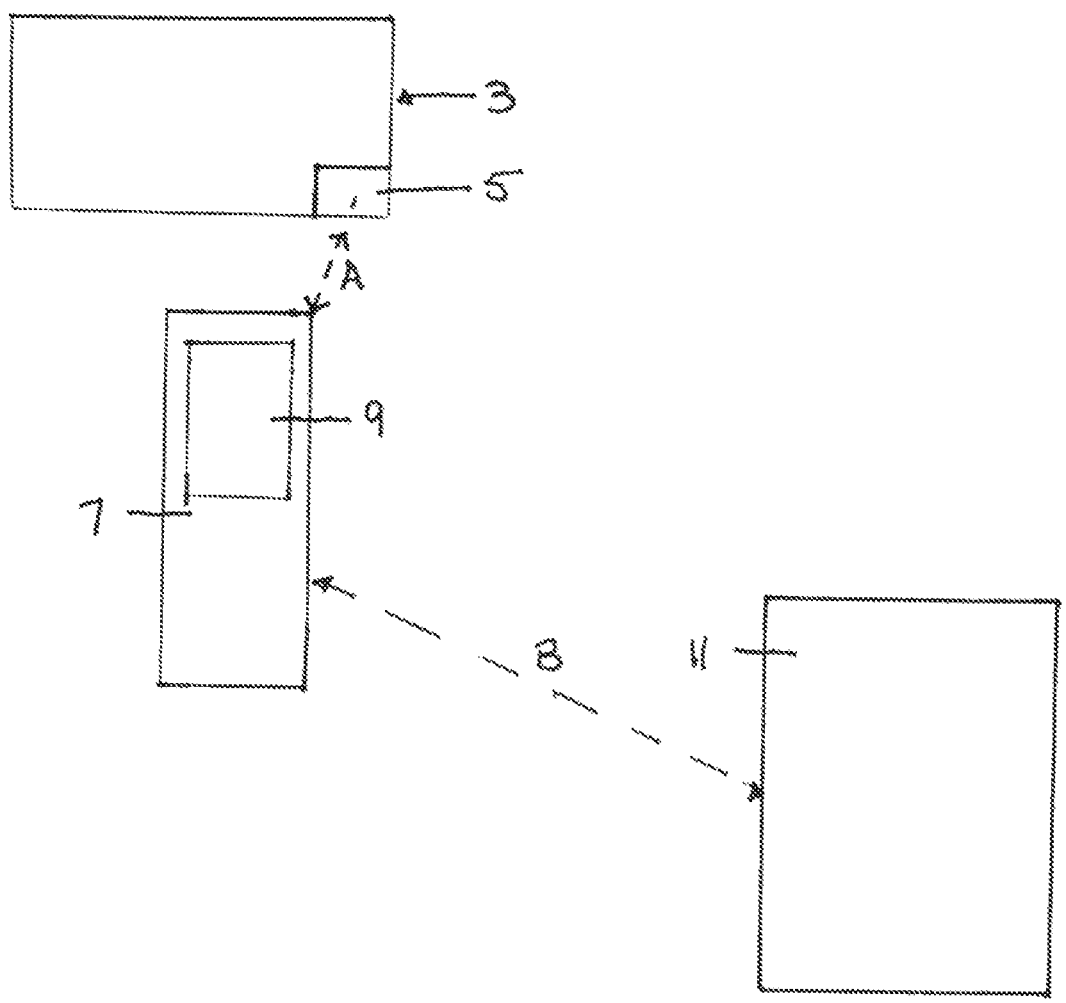

FIGURE 2

| HAND-HELD DEVICE INTERROGATES ARTICLE WITH READABLE INFORMATION IN PROXIMAL COMMUNICATION |

| READABLE INFORMATION RECEIVED BY HAND-HELD DEVICE |

| READABLE INFORMATION TRANSMITTED BY HAND-HELD DEVICE TO DISTAL SERVER |

| DISTAL SERVER ACCESSES MEMORY TO PROVIDE ADDITIONAL INFORMATION, INCLUDING ARTICLE/HAND-HELD DEVICE LOCATION |

| DISTAL SERVER SENDS ADDITIONAL INFORMATION TO HAND-HELD DEVICE BY WIRELESS COMMUNICATION |

| HAND-HELD DEVICE DISPLAYS AT LEAST SOME OF THE ADDITIONAL INFORMATION |

| HAND-HELD DEVICE ENABLES ACCESS TO ALTERNATIVE CONTENT FROM SERVER OR DIRECTED WEBSITES |

GEOGRAPHIC CHIP LOCATOR

BACKGROUND OF THE INVENTION

1. Field of the Invention

The present technology relates to electronic chips, geo chips, chips that communicate through near field or far field communication links, hand-held devices that sense and communicate with the chip, and hand-held devices that communicate with a distal server to store and broadcast information comprising at least location of the chip or the hand-held device to assist in identifying location of the chip and items associated with the chip.

2. Background of the Art

Involving from a combination of contactless identification and networking technologies, near field communication (NFC) is a wireless connectivity technology that enables convenient short-range communication between electronic devices. NFC is a very short-range wireless technology, for distances measured in centimeters, and is optimized for intuitive, easy and secure communication between various devices without user configuration. In order to make two devices communicate, users bring them close together or even make them touch. The devices' NFC interfaces will automatically connect and configure themselves to form a peer to peer network.

A further application of NFC is the combination of NFC applications with smart card security concept so that devices act like contactless smart cart with cryptographic capabilities. This NFC technology can be denoted as secure NFC and is standardized in ISO 18092, ECMA 340 and ECGS 102190. NFC is also compatible to the broadly established contactless smart card infrastructure based on ISO 14443 A.

The secure NFC can be included in wireless mobile communication devices like mobile phones, PDAs and the like. This means that confidential data and data that represents values is stored in a secure memory area and always stays on the mobile communication device. An authentication is performed by the secure NFC functionality included, for example, in a PDA or mobile phone and transmitted data can be encrypted by the secure NFC functionality using a private encryption key stored on the mobile phone.

The implementation of the secure NFC functionality into a wireless mobile communication device like a mobile phone allows the application of the mobile phone as for example a virtual stored transport ticket or an access key to a building (home or office), wherein the ticket or the access key is transferred by the secure NFC functionality of the mobile phone for granting the access to a transport means or a building.

Wireless mobile communication devices generally have to be equipped with autonomous energy sources due to their mobile character. U.S. Pat. No. 8,374,546 enables a secure NFC device with multiple energy sources.

U.S. Pat. No. 8,370,629 (Ngo) describes a system and method for determining and sharing of trusted location data. The system includes a network device or application and at least two independent trusted sources of location data/location assistance data, where the at least two independent trusted sources have unique and unalterable ID codes. The network device or application receive and authenticate the location information/location assistance data from the at least two independent trusted sources, and the network device or application calculates a trusted location estimate by comparing the location data of the at least two independent trusted sources. The network device or application is a self-aware device. The trusted location data may be virally shared with other self-aware network devices in the network.

U.S. Pat. No. 8,373,429 (Slupsky) describes a sensing system using RF technology with chips to interrogate information for location of or content of articles. The method and apparatus interrogates an electronic component, and includes a body having an interface for an interrogating device to use as a conduit in reliably performing multiple discrete interrogations of the electronic component without the interrogating device physically touching the electronic component (e.g., near field communication).

U.S. Pat. No. 8,368,515 enables an RFID device, and more particularly to a RFID device which can be used in both a tag mode and a reader mode. There is provided an RF antenna transmitting and receiving wireless signals; a tuning circuit as a frequency filtering circuit connected to the RF antenna; a memory storing data; and a wireless communication card including antenna connection terminals connected to the RF antenna.

U.S. Pat. No. 8,346,210 (Belsan) enables the use of tags for global positioning of services and the like. One or more services are managed corresponding to a bearer tag (e.g., near field communication (NFC) tag, radio frequency identification (RFID) tag, contactless card, or barcode). A request to manage a service is initiated by reading service information from a bearer tag corresponding to the one or more services. A services platform initiates management of the one or more services based on the service information according to a predetermined or recurring billing arrangement.

All references cited herein are incorporated by reference in their entirety.

SUMMARY OF THE INVENTION

A system obtains and transmits and stores information, including location information of an article associated with a chip. The system may contain at least: an article intimately associated with an electromagnetically interrogatable chip; a hand-held information receiving and transmitting device that can interrogate the chip, the hand-held information receiving and transmitting device comprising an RFID and/or NFC reader to electromagnetically interrogate the chip; the chip containing communicable information relating to the article; a distal server in wireless two-way communication with the hand-held information receiving and transmitting device, the distal server capable of receiving, storing and transmitting information from the chip transmitted through the hand-held device. Upon interrogation of the chip by the hand-held device, the hand-held device communicates data received in response from the interrogation of the chip to the server, the server containing information in memory that is transmitted to and receive by the hand-held device. The information contained in memory may include information specific to the article.

BRIEF DESCRIPTION OF THE FIGURES

FIG. 1 is a schematic of a system according to the present technology.

FIG. 2 shows a flow diagram in which a process according to the present technology is performed.

DETAILED DESCRIPTION OF THE INVENTION

Figure 3:
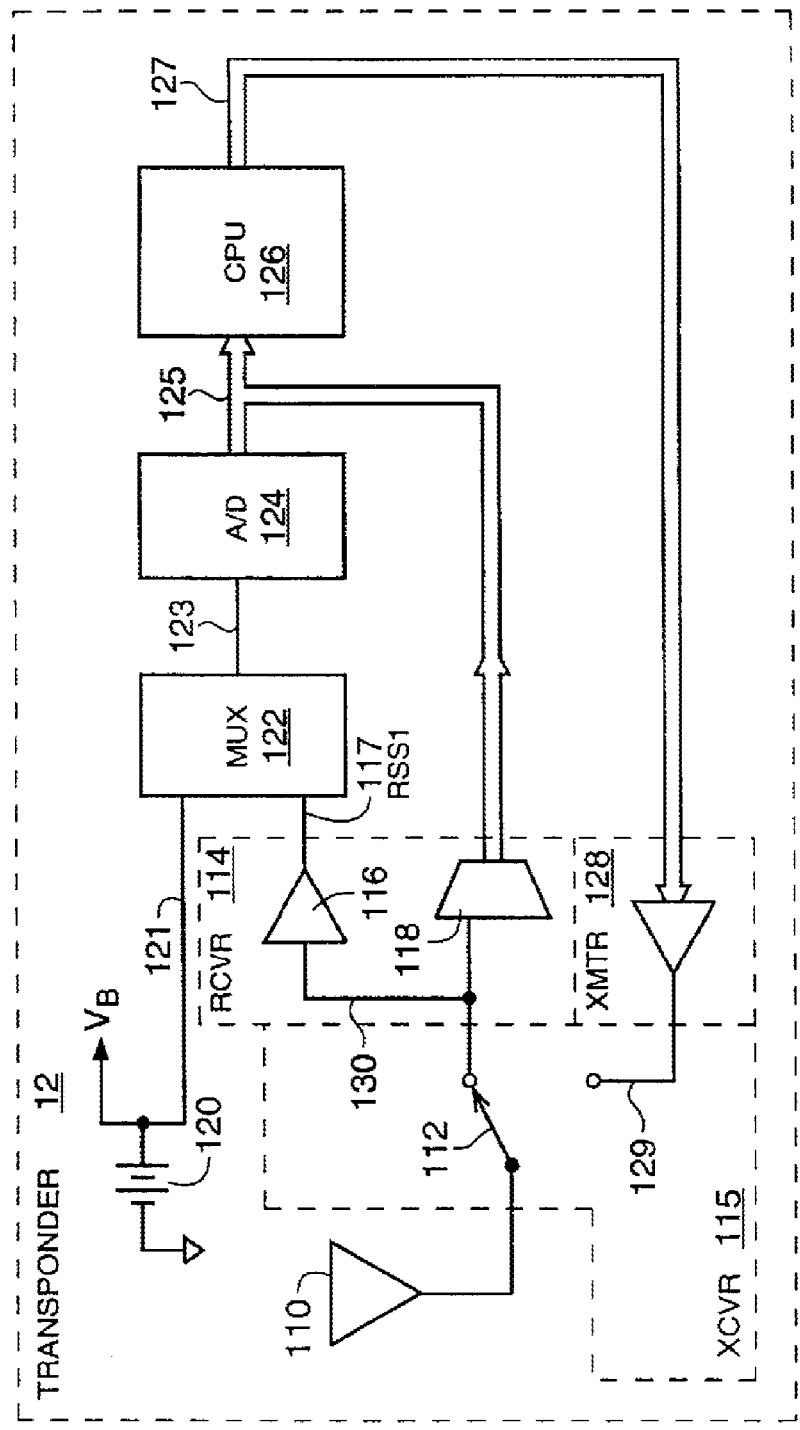
FIG. 3 is a functional block diagram of a transponder that may be used in the present invention, which is described in U.S. Pat. No. 6,487,681.

A system obtains and transmits and stores information, including location information of an article associated with a chip. The information relating to the article may include much of a wide array of information types, including, a generic descriptor of the article type, a specific descriptor of the article type (e.g., manufacturer, trade name, model number, etc.), pricing code (e.g., store code, price identifier), manufacturing date, shelf placement date, and the like.

The system may contain at least: an article intimately associated with an electromagnetically interrogatable chip, transceiver or transponder. The chip may contain permanent (non-erasable) information or may be programmable so that generic chips may be applied to different articles. The chips may be programed by initial embedding of information, wire transfer of information or wireless transmission to the chip, ASIC or field programmable gated array (FPGA). In a less preferred embodiment of the present invention, the article may have visually readable information (bar codes and the like) that can be recorded by visual, camera-like capture by the hand-held device. The hand-held device would still transmit the captured data to a distal server and would then also receive requested information back from the distal server. U.S. Pat. No. 8,364,552 describes a system and method for using a mobile phone having a camera. The systems and methods receive an image of a merchant access device (e.g., bar code and the like) and optionally location data from a mobile device of a user engaged in the transaction. The systems and methods also receive transaction information associated with the transaction and account information associated with an account of the user.

The hand-held information receiving and transmitting device that can interrogate the chip, the hand-held information receiving and transmitting device comprising an RFID and/or NFC reader to electromagnetically interrogate the chip. The hand-held device incorporating this functionality and the subcomponents necessary for effecting this functionality may be selected from any of the various types of hand-held communication devices operating on any wireless communication network to the server. Such devices, by way of non-limiting examples may include cell phones, smart phones, iPhones, pads, tablets, PDAs and the like.

The server computer may comprise a processor, a computer readable storage medium, and software stored on the computer readable storage medium, the software, when executed by the processor, causes the server computer to perform functions including: receiving, during a transmission from the hand-held device between a consumer and the article from a merchant via a personal hand-held device, merchant access device associated with the merchant, and a merchant wifi system, or wifi system provided by the provider for the hand-held device (which mat capture an image of the merchant access device), the image may include characteristics of the merchant access device located outside of an electronic display of the merchant access device; receiving, during the transmission of information between the consumer and the merchant or server, location data indicating a location of the mobile communication device (and hence the article); identifying the merchant access device from a plurality of merchant access devices associated with the merchant participating in the transmission of information using the characteristics/data/accessible information of the merchant access device located within or outside of an electronic display of the merchant access device included in the received image; wherein identifying the merchant access device includes: comparing the received image with images/information originally sent to (by the hand-held device) or stored in a database to determine a matching image or transmitted and stored information; and comparing the received location data with location data stored in the database to determine a matching location, the database having images and location data associated with merchant access device identifiers; and sending an authorization response message to the merchant access device. The authorization response message may indicate whether or not the information is accurate and is approved.

The chip may contain communicable information relating to the article. A system may comprises one or more user equipment (UEs) (the hand-held device) having connectivity to a communication network. The UEs are any type of mobile terminal, or portable terminal including laptop computers with scanner attachment, handsets, units, devices, multimedia tablets, Internet nodes, communicators, Personal Digital Assistants (PDAs), mobile phones, mobile communication devices, digital camera/camcorders, audio/video players, positioning devices, game devices, and/or the like, or any combination thereof. It is also contemplated that the UEs can support any type of interface to the user (such as "wearable" circuitry, etc.). The UEs permit rapid management, like for example discovery, activation, accessing, modification, and set-up of one or more services, including services, applications, and content, or any combination thereof (referred to herein as "services").

By way of example, the communication network of system includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

The system also includes bearer tags/chips, with each bearer tag corresponding, for example, to one or more services. In exemplary embodiments, the bearer tag is a near field communication (NFC) tag, radio frequency identification (RFID) tag, contactless card, barcode, or any combination thereof that contains information related to the one or more corresponding services related to the article of interest. The service information contained in the bearer tag may include, for instance, one or more service codes to identify the one or more services represented by the bearer tag. It is contemplated that in other embodiments, the bearer tag may contain additional service related information (e.g., expiration date, use restrictions, etc.). The bearer tags, for instance, are embedded in, attached to, or printed on any of a variety of materials capable of supporting the tag (e.g., packaging material, a sticker, a poster, a card, etc.). The UEs each include one or more readers capable of reading the bearer tags, e.g., a near field communication (NFC) reader, radio frequency identification (RFID) reader, contactless card reader, barcode reader, camera, and/or the like, or any combination thereof.

By way of example, NFC, RFID, contactless card, and similar technologies are short-range wireless communication technologies that enable the exchange of data between devices over short distances (e.g., the range for NFC is approximately 4 inches). In general, these technologies comprise two main components, a tag (e.g., attached to an object) and a reader (which can be implemented with the UEs). Communication between the reader and the tags occur wirelessly and may not require a line of sight between the devices. The tag (e.g., an RFID transponder) is, for instance, a small microchip that is attached to an antenna. The tags can vary in sizes, shapes, and forms and can be read through many types of materials.

Moreover, the tags may be passive tags or active tags. Passive tags are generally smaller, lighter, and less expensive than active tags. Passive tags are only activated when with the response range of a reader. The reader emits a low-power radio wave field that is used to power the tag so as to pass on any information that is contained on the chip. Active tags differ in that they incorporate their own power source to transmit rather than reflect radio frequency signals. Accordingly, active tags enable a broader range of functionality like programmable and read/write capabilities.

A distal server is in wireless two-way communication with the hand-held information receiving and transmitting device, the distal server capable of receiving, storing and transmitting information from the chip transmitted through the hand-held device. Upon interrogation of the chip by the hand-held device, the hand-held device communicates data received in response from the interrogation of the chip to the server, the server containing information in memory that is transmitted to and receive by the hand-held device. The information contained in memory may include information specific to the article.

RF techniques are then used to transmit data between the inductors. For example, a digital signal can be modulated by a carrier wave, and then driven through an inductor. The receiving inductor picks up some fraction of this modulated wave, and passes the signal on to a receiver circuit. The use of RF techniques for transmitting data is the reason the inductors are sometimes called "antennae." Many microfabricated antenna designs have been, and continue to be, researched for various applications such as clocking and data transfer. These designs are generally intended for non-test applications and do not meet the cost, performance and data integrity requirements for applications such as SiP testing. The designs presented here create RF transceivers meeting the cost and performance goals of SiP applications. Specialized RF CMOS technologies and other technologies like SiGe are not used for the stated economic reasons, but the concepts may be implemented in these processes for technical reasons. Although many designs may be used for transmitting and receiving data wirelessly, many are not suitable in wafer testing applications since they require a large power budget, or utilize large amounts of silicon real estate on the device under test (DUT) or probe. Additionally, the bit error rate for testing purposes must be extremely low.

The use of RF based interconnects alleviates the need to reduce the number of touch downs on signal i/o (input/output) pads. Further, as has been discussed, KGD levels improve dramatically since a more thorough wafer level test is performed. These two benefits combine to suggest RF based interconnects provide a means for improving SiP process test flow and consequently manufacturing yields.

The method of wireless communication is not limited to inductive coupling, however. It is possible to use other forms of near-field communication, such as capacitive coupling, for communication. As well, far-field communication is also a viable technique, where one antenna receives far-field radiation from a transmitting antenna. Further, optical methods such as lasers, photo diodes, and electro-optic components may be used to couple electronic circuits. Another method involves the use of magnetics such as high speed magnetic circuit (MR, GMR, TMR, etc.) components to couple electronic circuits.

One method for improving manufacturing yields is to perform tests of the SiP during the manufacturing process flow. Such testing enables defects to be identified early in the process and rework and repair to be affected or the component can be discarded and reduces the cost of the discard by eliminating additional process steps and their associated additional value. The implementation of a process flow with just one repair step can have a significant impact on manufacturing yield. SiP's are manufactured with materials that are susceptible to probe damage in the same way as CMOS VLSI integrated circuits.

However, wireless access has limitations. One limitation is that there may be a need to provide power to the device being accessed. A limited amount of power can be provided without physical contact to a chip undergoing access, for example, but the amount of power may be inadequate for accessing of complex multicomponent circuits on such a chip. Hence it would be more beneficial to develop a method for accessing electronic components in which the probe can be configured to interface one or both of wireless access and a wireline access methods.

One method to allow physical probing without causing damage is to "ruggedize" the physical contact. For example, use thick metal that will withstand multiple touchdowns or metallurgy that is not compatible with standard manufacturing techniques for integrated circuits but may be applied in a post process. Such metallurgy may include gold contacts, tungsten contacts, etc.

The chip or RFID reader according to U.S. Pat. No. 8,368,515 may include an RF antenna, multiple (e.g., three) antenna connection terminals, a tuning circuit, a memory, a controller, and a secondary battery. The wireless chip or card communicates with an external RFID tag or an RFID reader (e.g., the hand-held device), and stores data into a memory (in the distal server or temporarily in the hand-held device). The RF antenna selectively identifies a radio wave having a frequency (e.g., 13.56 MHz) from among radio waves radiated in the air for RFID communication. In active mode the RF antenna transmits RF communication data to the outside in active mode. The RF antenna is a general loop antenna used for both passive and active mode. The multiple antenna connection terminals are connected to the RF antenna, and are exposed to the outside of the wireless communication card or chip. The multiple antenna connection terminals support both active and passive modes. The multiple antenna connection terminals may be made of a conductive material and are located in parallel to be exposed to a short edge of the wireless communication card or chip. The location of the multiple antenna connection terminals may vary according to the structure of the article and the mode of attachment of the chip to the article.

The tuning circuit is electrically connected to the multiple antenna connection terminals respectively, and is electrically connected to the RF antenna. A tuning circuit filters a particular frequency (e.g., of 13.56 MHz). The tuning circuit is a general circuit used for RFID communication.

Basic data about RFID and diverse data are stored in the memory of the hand-held device (temporarily) or in the distal server. For instance, when the RFID hand-held device is used as a transportable consumer guide information source, detailed data about the generic class of goods, the goods alternatives at that determined location, specific data about individual alternatives, advertisements, warnings, and other information provided about the product by the manufacturer can be sourced from the distal server, and may be stored in the memory of the distal server and displayed transiently on the hand-held device. The memory on the server may be a non-volatile memory such as a flash memory, wherein data stored therein are not erased even when power is not supplied to it.

The hand-held device is electromagnetically connected (in a communication link, as by RFID or near-field communication) to the RF antenna and then by any wireless link to the memory in the distal server. The controller transmits data stored in memory in the outside (distal server) through the RF antenna, or stores data received by the RF antenna in the memory. When the controller is in passive mode, it is operated by currents induced by radio waves emitted from the RFID reader, the hand-held device. When the controller is in active mode, it is operated by power provided by a wireless communication controller set received through the RF antenna0. The controller is provided in the form of an integrated circuit (IC) chip. Although a controller may be provided in the embodiment of the present invention, it may not be included in another embodiment of the present invention. In the absence of a controller, the memory may be controlled by a microcontroller unit (MCU) mounted on the wireless communication controller set. In this case, the memory may be connected to the MCU of the wireless communication controller set through the antenna connection terminals.

The secondary battery includes a bare cell, a protection circuit, and two charge/discharge terminals. The secondary battery supplies power to the wireless communication controller set. Although not illustrated, the bare cell is an electrical energy source, and may include an electrode assembly (not shown) and a pouch (not shown) surrounding the electrode assembly (not shown). The electrode assembly may include a first electrode plate (not shown), a second electrode plate (not shown), and a separator (not shown). The electrode assembly may have a form of a plate in which the separator is located between the first electrode plate and the second electrode plate. The electrode assembly is sealed by the pouch (not shown) together with a polymeric electrolyte. Although not illustrated, the bare cell includes a positive electrode terminal and a negative electrode terminal connected to the protection circuit.

Reference to the Figures will further advance enablement and appreciation of the present technology.

FIG. 1 shows a schematic of a system enabling one embodiment of the present invention. The article 3 is shown with the responsive tag 5 on its surface. The responsive tag may be embedded in or adhered to the article 3. The tag 5 may be removable and reprogrammable for reuse. It may be applied to the article 3 by adhesive (permanent if not removable, pressure-sensitive if removable), clips, pins, snaps and the like. The chip/tag 5 is shown as in near-field communication along path A with a hand-held device 7 having a view screen 9. The hand-held device 7 is shown to be in wireless communication along path B with the distal server 11. Each communication path A and B should be two-way communication, although the communication path A between the tag/chip 5 and the hand-held device 7 may be one way, as the chip may need only to be activated or stimulated or charges by the hand-held device, without substantive information being transferred to the chip/tag.

FIG. 2 shows a flow diagram for one method of practicing technology within the scope of the present invention.

FIG. 3 is a functional block diagram of a transponder that may be used in the present invention represented in the system of FIG. 1. Transponder 12 includes battery 120, antenna 110, transceiver 115, multiplexer 122, analog to digital (A/D) converter 124, and central processing unit (CPU) 126. Transceiver 115 includes transmit/receive switch 112, receiver 114, and transmitter 128. Transponder 12 operates from battery power provided by battery 120. All functional blocks are coupled to receive battery power signal VB.

The present technology has a wide range of applications and should not be limited by the specific examples provided of fields of use, components and methodology, except as limited by the language of the claims. For example, the system may be used on parking lot tickets or a chip in the car, so that the ticket is scanned on the parked car (having a unique identity and temporary location), the scanned information and location is then sent to the distal server and stored, identifying by GPS (global positioning satellite or other positioning mechanism) the specific location of that car, especially within the parking lot. Upon return of a driver to the parking lot, the hand-held device can again interrogate the distal server and get the specific location and/or directions to the car where previously parked.

These and other variations are included within the generic concepts of the present invention.

The invention claimed is:

1. A system for obtaining and transmitting and storing location of an article associated with a chip, the system comprising: an article intimately associated with an electromagnetically interrogatable chip, transceiver or transponder; a hand-held information receiving and transmitting device that can interrogate the chip, transceiver or transponder, the hand-held information receiving and transmitting device comprising an RFID or NFC reader to electromagnetically interrogate the chip, transceiver or transponder; the chip containing communicable information relating to the article; a distal server in wireless two-way communication with the hand-held information receiving and transmitting device, the distal server configured to receive, store and transmit information from the chip, transceiver or transponder transmitted through the hand-held device; wherein upon interrogation of the chip, transceiver or transponder by the hand-held device, the hand-held device is configured data received in response from the interrogation of the chip, transceiver or transponder to the server, the server configured to contain information in memory and configured to transmit that information in memory to be received by the hand-held device, wherein the information contained in memory comprises information specific to the article.

2. The system of claim 1 wherein the chip, transceiver or transponder is programmable to receive information relating to the article.

3. The system of claim 2 wherein the chip, transceiver or transponder is configured to be distally programmable to receive information relating to the article.

4. The system of claim 1 wherein the hand-held device is configured to interrogate the chip, transceiver or transponder and accept information from the chip through near-field communication, and is configured to transmit and receive information to the distal server by wireless communication.

5. The system of claim 4 wherein the wireless communication between the hand-held device and the distal server is enabled through long-range electromagnetic communication systems.

6. The system of claim 5 wherein the long-range electromagnetic communication systems comprises a radio frequency communication system.

7. The system of claim 5 wherein the chip, transceiver or transponder is configured to be distally programmable to receive information relating to the article.

8. The system of claim 4 wherein the chip, transceiver or transponder is configured to be distally programmable to receive information relating to the article.

9. The system of claim 1 wherein the article is an automobile in a parking lot and location of that car within a parking lot is stored at the distal server and establishes retrievable information on the location of the automobile.

10. A method of using the system of claim 1 wherein the hand-held device interrogates the interrogatable chip, transceiver or transponder on a specific article and receives information from the interrogatable chip, transceiver or transponder in near-field communication or visually captured information; the received information is transmitted top the distal server by wireless transmission and is then stored in memory at the distal server, the received information comprising at least location information for the specific article.

11. The method of claim 10 wherein the hand-held device communicates by wireless transmission with the distal server and retrieves location information from the distal server.

12. The method of claim 11 wherein the distal server provides to the hand-held device, in addition to location information, a menu of additional information available with respect to the specific article or related articles.

13. The method of claim 12 wherein the additional information comprises advertising content or product information on the specific article.

14. The system of claim 1 wherein the chip, transceiver or transponder is configured to be distally programmable to receive information relating to the article.

\* \* \* \* \*